United States Patent Office.

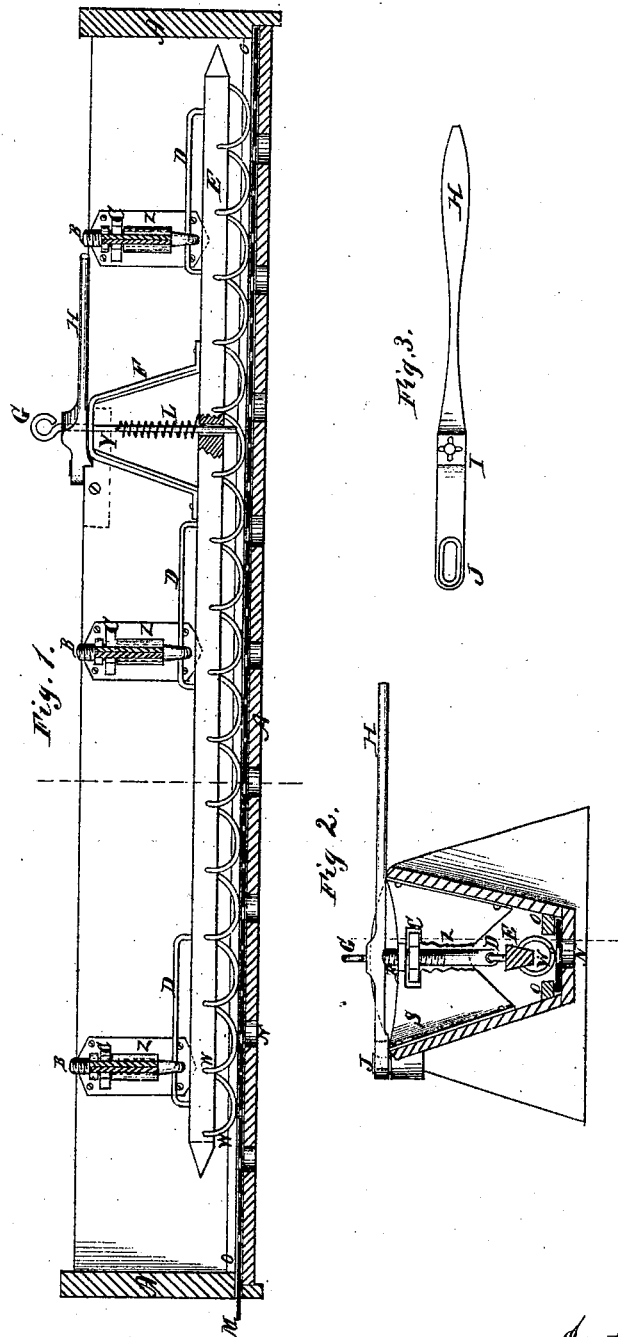

JUSTIN G. THOMPSON AND FREDERIC M. BRIGGS, OF STOCKTON, NEW YORK; SAID BRIGGS ASSIGNS HIS RIGHT TO SAID THOMPSON.

Letters Patent No. 109,470, dated November 22, 1870.

IMPROVEMENT IN SEED-SOWERS.

The Schedule referred to in these Letters Patent and making part of the same.

Be it known that we, JUSTIN G. THOMPSON and FREDERIC M. BRIGGS, of Stockton, in the county of Chautauqua and State of New York, have invented a new and improved Seed-Sower; and we do hereby declare that the following is a full, clear, and exact description thereof, which will enable others skilled in the art to make and use the same, reference being had to the accompanying drawing forming part of this specification, in which—

Figure 1 is a vertical longitudinal section of our improved machine.

Figure 2 is a vertical cross-section of the same.

Figure 3 is a perspective view of the upper side of the lever.

Similar letters of reference indicate corresponding parts.

Our invention has for its object to furnish a simple, convenient, and effective machine for sowing different kinds of seed, which is designed to be carried by the operator, and operated to sow the seed by hand; and It consists in the construction and combination of the various parts of the machine, as hereinafter more fully described.

A represents a trough or box, which we prefer to make about ten feet long, and the sides from four to six inches high, supported by partitions, B, to be made either of wood or metal, and placed at intervals of about two feet.

In the bottom of the box A is formed a row of holes, N, about three inches apart, through which the seed passes to the ground.

M is a slide in the bottom of the box A, which may be made of wood or metal.

In the slide M are formed two or more sets or series of different-sized holes, the holes of each size or series being at a distance apart equal to that of the holes N, so that, by simply adjusting the position of the slide M, the machine may be adjusted for sowing different-sized seed.

The slide M is kept in place by the grooves O O in the bottom of the box A.

E is a bar, which is made a little shorter than the box A, so that it may have a longitudinal movement within said box A.

W is a wire, which is passed through the bar E, passed spirally beneath the said bar, again through it, and so on for the entire length of the said bar E, forming a series of spiral loops beneath the bar E.

To the upper side of the bar E, near its ends, and at its center, are attached long staples, D, which pass through holes in the bolts Z, which bolts pass loosely through the partitions B vertically, and are raised or lowered by the nuts C, turning in slots in the partition B.

F is a standard, made of either wood or metal, the lower end of which is attached to the bar E, and to the upper end is pivoted the lever H. One end of the lever H is pivoted to the side of the box A, or to a block or support attached to said side, and its other end projects at the other side of said box in such a position that it may be conveniently reached and operated by the operator.

G is a metallic rod or bolt, passing through the lever H and standard F and bar E vertically, in such a manner that it serves for pivoting the lever H upon the standard F, and, by being lowered, the lower extremity of said bolt G, engages in one of the holes in the slide M, so that, by the movement of the lever H, the slide M may be adjusted.

L is a spiral spring surrounding the bolt G, and attached to it at one end at the point Y, and attached at the other extremity to the bar E in such a manner as to draw downward on the bolt G.

At the point I in the lever H, fig. 3, is an elevation upon the upper side of said lever, with notches for holding the rounded extremity of the bolt G in place; also, a depression or fissure at right angles to and much deeper than the aforesaid notches, to admit the rounded extremity of the bolt G when it is desired to lower said bolt for the purpose of moving the slide M.

At the point J in the lever H is a slot, broadest at its inner extremity, through which the screw passes which pivots the lever H to the side of the box A.

On the under surface of the lever H is the projection S, fig. 2, at such a distance from the point I in the lever H, fig. 3, that, when the lever H is at right angles with the box A, and the standard F is perpendicular, the said projection will rest against the side of the box A.

What we claim as new, and desire to secure by Letters Patent, is—

1. The combination of the bolt G and spiral spring L, substantially as and for the purposes hereinbefore set forth.

2. The combination of the bolts Z Z Z and the nuts C C C, substantially as and or the purposes hereinbefore set forth.

3. An improved seed-sowing machine, formed by the combination of the box A, slide M, spirally-looped wire W, suspended bar E, standard F, bolt G, spiral spring L, bolts Z Z Z, and nuts C C C, lever H, with each other, said parts being constructed and operating substantially as and for the purposes set forth.

JUSTIN G. THOMPSON.
FREDERIC M. BRIGGS.

Witnesses:
D. W. SPERRY,
J. C. RUSS.